Patented Dec. 11, 1928.

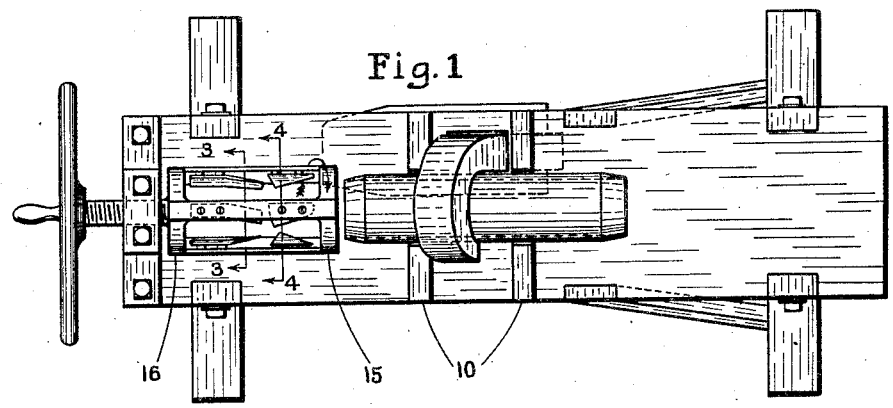
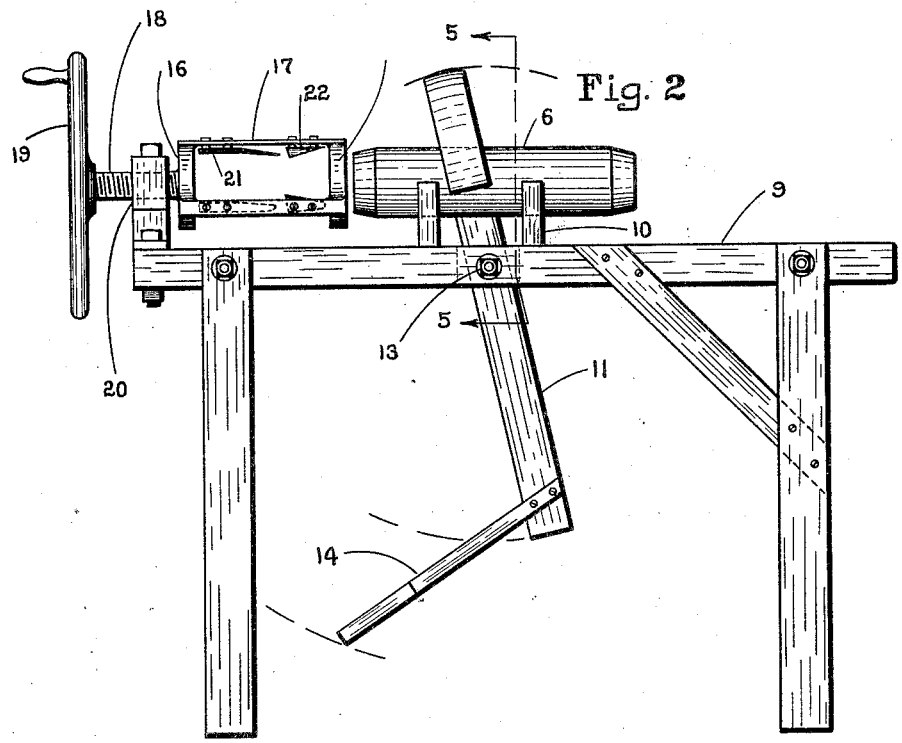

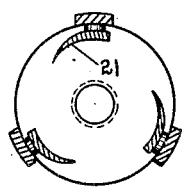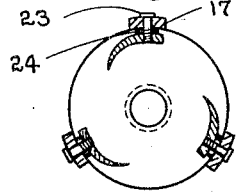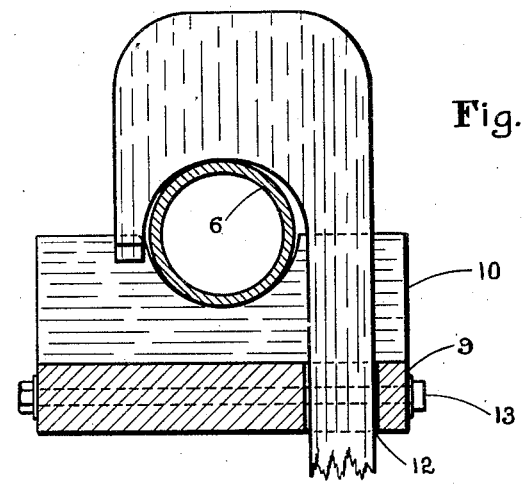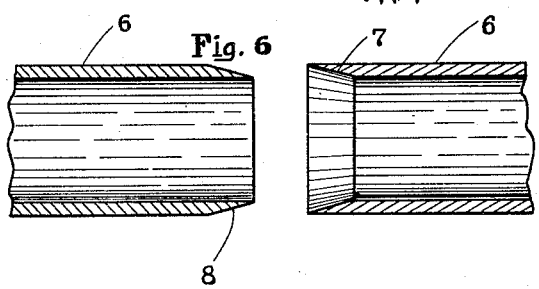

1,694,685

UNITED STATES PATENT OFFICE.

JULIUS HEIN, OF LAKEWOOD, OHIO.

MACHINE FOR SHAPING THE ENDS OF HOLLOW DUCTS.

Application filed September 29, 1927. Serial No. 222,924.

This invention relates to machines for shaping the ends of hollow ducts, such for example as those used for electrical conduits, the ends of which are fitted together. These ends are reduced or beveled to fit one within the other, and the object of the present invention is to provide an improved machine for shaping the ends, the machine being portable so that it can be set up wherever the work may be.

The invention is illustrated in the accompanying drawings in which Fig. 1 is a top plan of the machine. Fig. 2 is a side elevation. Figs. 3 and 4 are sections on the line 3—3 and 4—4 of Fig. 1. Fig. 5 is a section on the line 5—5 of Fig. 2. Fig. 6 is a detail in section of the shaped ducts.

The ends of the ducts or sections are indicated at 6, and are usually made of fibrous material. They are supplied in various lengths, and the ends are joined together by beveling the inside of one, as indicated at 7, and the outside of the other, as indicated at 8, to form a tight joint.

The machine consists of a bench 9 having work rests 10 on which the duct section 6 is clamped by a swinging hook clamp lever 11 working in a slot 12 in the top of the bench where it is pivoted by a bolt 13. A treadle 14 projects from the lower end of the lever, so that pressure can be applied by the foot to clamp the work.

For scarfing or shaping the ends a rotary cutter is employed consisting of a head or frame having an end ring 15, a rear head 16, and spaced longitudinal bars 17 connecting the same. The head 16 is fixed to the end of the screw 18 which is provided with a hand wheel 19 and works in a threaded block 20 mounted on the end of the bench.

The cutting blades consist of two sets, one for scarfing the inside of the duct and one for the outside. The former are indicated at 21 and the latter at 22. These blades are fastened to the bar 17 by bolts 23 and spacing washers 24, the blades being located on the inside of the bars 17. The blades are properly curved and beveled at their cutting edges to do the work indicated. The outside blades 22 are located in advance of the blades 21 for the inside work. When the latter are to be used the former are removed so that the blades 21 can enter the duct.

In operation, the duct section is clamped on the bench in front of the cutters and the latter are then advanced and rotated by turning the screw. The knives 22 will scarf the outside of the end. As stated, when the inside is to be scarfed the knives 22 are removed and then when the cutters are advanced and rotated the knives 21 will enter the bore of the conduit and scarf the inside. After this work is done the cutters are withdrawn by reverse movement of the screw, and the ends of the duct sections can then be fitted together.

The invention is not limited to the special device shown but may be modified in various ways within the scope of the following claim.

I claim:

The combination with a work clamp, of a hollow head into which the end of the work may enter and having a set of longitudinal bars, sets of inside and outside scarfing cutters attachable to the inner side of said bars, and means to rotate and advance the head.

In testimony whereof, I do affix my signature.

JULIUS HEIN.